(No Model.)
M. G. KELLOGG.
MULTIPLE SWITCHBOARD.
No. 592,343.  Patented Oct. 26, 1897.
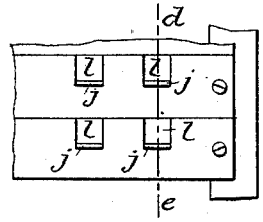
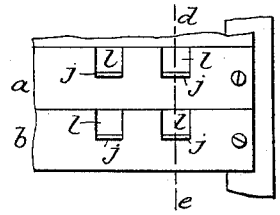
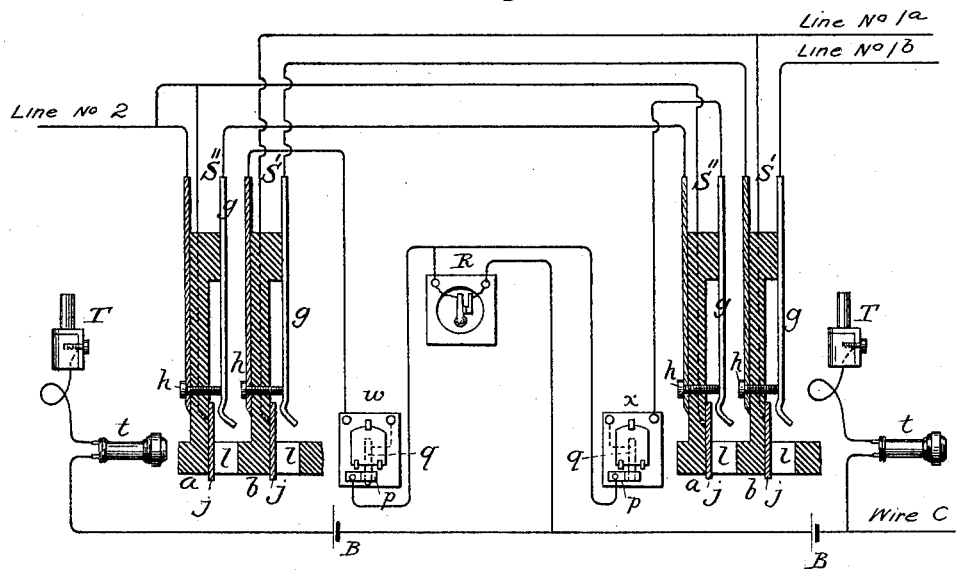
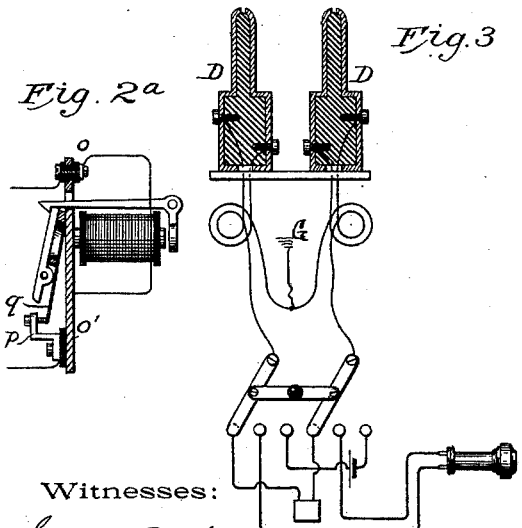
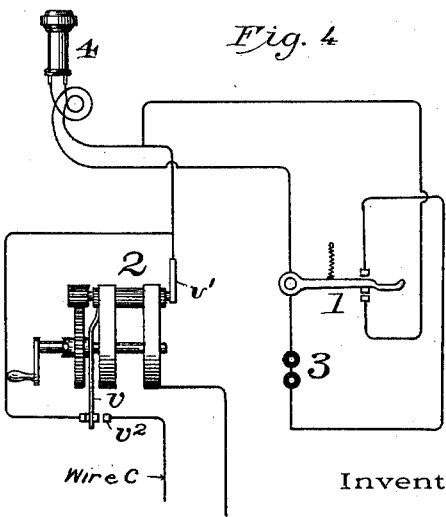
Witnesses:
Inventor.
Milo G. Kellogg.
by his attorneys.

UNITED STATES PATENT OFFICE.

MILO G. KELLOGG, OF CHICAGO, ILLINOIS, ASSIGNOR TO THE KELLOGG SWITCHBOARD AND SUPPLY COMPANY, OF SAME PLACE.

MULTIPLE SWITCHBOARD.

SPECIFICATION forming part of Letters Patent No. 592,343, dated October 26, 1897.

Application filed December 21, 1889. Serial No. 334,521. (No model.)

*To all whom it may concern:*

Be it known that I, MILO G. KELLOGG, of Chicago, in the county of Cook and State of Illinois, temporarily residing at Stuttgart, in the Empire of Germany, have invented certain new and useful Improvements in Multiple Switchboards for Telephone-Exchanges, of which the following is a full, clear, concise, and exact description, reference being had to the accompanying drawings, forming a part of this specification.

My invention relates to telephone-exchange systems in which the lines are single-circuit lines or metallic-circuit lines or in which the two lines are combined in one exchange; and it consists in a system of switching, calling, and testing with such lines which I shall describe and claim.

I place as many boards in the central office as are found necessary or desirable in order to properly answer the calls and make the necessary connections and disconnections. On each board is a spring-jack or similar switch for each line. Each switch has a contact-spring which normally bears on an insulated contact-point and has a contact-piece insulated from the rest (except by the circuit connections) and is adapted to receive a loop-switch plug and, when a plug is inserted, to disconnect the spring from the contact-point and connect the two contact-pieces of the plug with the spring and with said switch contact-piece, respectively.

The lines of the exchange, whether single or metallic circuit lines, pass successively through the pairs of contact-points of their switches on the several boards. The lines then unite into a common wire, in which is a rheotome and battery. When the lines are switched for conversation, they are disconnected from this common wire. Test receiving instruments at each board are connected to the other side of the rheotome and are adapted to be brought for testing into connection with the several lines whether the lines are switched or not. The test receiving instruments and the rheotome and its common wire are disconnected from the ground at the central office.

In the accompanying drawings, illustrating my invention, Figures 1$^a$ and 1$^b$ represent sections of two multiple switchboards of the exchange to which the same lines are connected. Fig. 2 shows a diagram of the boards with the line connections and apparatus necessary to illustrate my invention. Fig. 2$^a$ is a detail view of one of the line-annunciators. Fig. 3 shows an operator's cord system to be used with the boards. Fig. 4 shows a subscriber's-station apparatus.

In the drawings like parts and apparatus are indicated by the same letters and figures of reference.

In Fig. 2, A is a sectional view of the switchboard shown in Fig. 1$^a$, and A' is a sectional view of the switchboard shown in Fig. 1$^b$, each as indicated by the line $d\ e$.

In Fig. 2, $g\ g$ represent the springs of the switches, $h\ h$ the contact-points on which the springs normally bear, and $j\ j$ the insulated contact-pieces of the switches. $l\ l$ are the switch-holes. $a\ b$ are the rubber strips on which the contact-pieces are mounted, as shown, and through the fronts of which are the holes $l\ l$. The insulated contact-pieces $j\ j$ of the switches are so placed that a test-plug or similar device may readily be applied to them. When a switch-plug (shown in Fig. 3) is inserted into a switch-hole $l$, it separates the pieces $g\ h$ of the switch and one of the contact-pieces of the plug is in contact with the piece $j$ and the other piece is in contact with the spring $g$. The switches for the single-circuit lines are marked S'' and those for the metallic-circuit lines are marked S'.

R is a rheotome or mechanical circuit-breaker containing a clockwork-movement actuated by a spring. It contains an oscillating bar fixed to the verge-shaft and standing at right angles to it. A pair of contact-points is connected with the bar or with the shaft in such a way that their contact is alternately made and broken with the oscillations. The pair of contact-points are properly insulated and are connected into the circuit, as indicated for the rheotome. Instead of the rheotome shown any form of mechanical or electrical rheotome, or any apparatus which changes the electrical condition of the line so that the change will be indicated on the test receiving instruments, may be connected into the circuit, as indicated for the rheotome.

$w$ and $x$ are calling-annunciators, one for each of the lines shown. Each annunciator has a pair of contact-points normally (or when the annunciator does not indicate a call) in contact with each other, but which are separated by the annunciator while it indicates a call. The two contact-points of a pair are marked $p$ and $q$, respectively. One of them, $q$, is a spring-contact, which is pressed by the annunciator-drop when the drop falls away from its corresponding contact-point $p$. The contact-point $p$ is represented as an angle-piece, which passes over the spring $q$ and is in contact with the spring when the spring is not actuated by the annunciator-drop.

Two lines are shown in Fig. 2, one a metallic-circuit line the two sides or branches of which are marked line No. $1^a$ and line No. $1^b$, respectively, and one a single-circuit line (to be grounded at its outer end) marked line No. 2.

The circuit of the single-circuit line is as follows: from the subscriber's ground, through his station apparatus, through the line and the pairs of contact-points $g\,h$, successively, of its switches on the several boards, going in each case to the point $h$ first, thence through its line-annunciator to the common wire of the lines, in which is the rheotome. All the contact-pieces $j\,j$ of a single-circuit line are connected together and to their line between its switches and the subscriber's station. The two contact-points of the line-annunciator $p\,q$ are placed in the circuit of its line between the several pairs of contact-points of the line-switches and the point where the line unites with said common wire, in which is the rheotome.

The circuit of a metallic-circuit line is as follows: One side or branch of the line, say line No. $1^a$, as shown, is connected with all the contact-pieces $j\,j$ of its switches on the boards. The other branch of the line, say line No. $1^b$, passes successively through the pairs of contact-points $g\,h$ of its switches on the several boards, going in each case to the spring first. It then passes through the line-annunciator, and thence to the common wire, in which is the rheotome. The two contact-points of the line-annunciator $p\,q$ are placed in the circuit of its line between the several pairs of contact-points of the line-switches and the point where the line unites with said common wire, in which is the rheotome.

The annunciator is illustrated in detail in Fig. $2^a$. The line runs to an insulated bolt $o$ at the top of the annunciator-plate $o'$, thence through the annunciator-coil to the plate, and thence normally through spring $q$ and insulated angle-piece $p$, mounted on the plate, to the rheotome R.

$t\,t$ are test-receiving instruments, one at each board. The test receiving instrument should be of such a character that it will respond to variations in the strength of the test-current. It is preferably a magneto-telephone, as shown, on account of the sensitiveness of this device to variations in the test-current.

T T are test-plugs, one for each instrument, each connected by a flexible cord to one side of its instrument and adapted to be brought for testing into connection with any contact-piece $j$ at its board. The other side of each test receiving instrument is connected to said common wire of the lines in which is the rheotome. The connection of the test receiving instruments to said common wire must be on the other side of the rheotome from that to which the lines are normally connected.

B B are test-batteries. There should be a test-battery in the circuit between the place where the lines are united with said common wire and any test-plug. The battery may be placed in the common wire between the place where the lines unite with it and the place where the test-instrument circuits branch off from the common wire. In that case only one battery would be required for the exchange.

The common wire in which is the rheotome is marked wire C, and it extends, insulated from the lines, to each subscriber's station and is connected to each station apparatus, as will hereinafter be described.

In the operator's cord system shown in Fig. 3 D D are two loop-plugs, the two contact-points of which are connected by double flexible cords to their loop-switch clearing-out annunciator and the operator's telephone and calling-generator, substantially as shown. Only one pair of plugs, with their cords and apparatus, is shown, but other pairs may be added in a way which will be apparent to those skilled in the art.

One of the contact-pieces of each of the loop-switch plugs is connected by a flexible conductor to a lever of the looping-in switch, and the two other contact-pieces of the plugs are connected together by means of a flexible-cord circuit. One pair of the plug-bolts are connected together through a clearing-out annunciator, another pair are connected together through the operator's telephone, and the third pair are connected together through the calling generator or battery.

The operator's cord outfit does not require specific description, as any of the usual cord outfits might be adapted to this exchange. The essential feature is that when a line is switched at central it should be cut off from the rheotome.

In the subscriber's station apparatus shown in Fig. 4, 1 is the telephone-switch. 2 is the calling-generator. 3 is the signal-receiving bell, and 4 is the subscriber's telephone. These parts may be the usual forms of apparatus and are connected, as shown, or in other ways, so as to produce the required results. The generator, however, is modified and is as shown.

The modification consists, essentially, in the number and arrangement of the contact-points of the automatic device. The automatic device shown is a modification of a form very generally used. It consists in a V-shaped attachment to the hub of the driving-wheel, a pin in the shaft which engages in this V-shaped arrangement, and a spring which presses against the wheel and brings the pin normally in the center of the V arrangement. The contact-points and circuits are substantially as shown. One side or branch of the line connects with the frame of the generator, as does also one end of the armature-coil and the spring $v$ of the automatic device. The other side or branch of the line connects to the insulated spring $v'$, which bears on an insulated piece on the armature-shaft, to which the other end of the armature-coil is connected. The contact-point $v^2$, with which the spring of the automatic device is pressed into contact when the generator is operated, is connected to the wire $c$. The side or branch of the line which is grounded at the central office is the one connected to said insulated spring of the generator. When it is not in operation, the subscriber's line is open to the common wire $c$ at his station. While it is being operated the line is automatically connected with said common wire $c$, with the armature-coil between said connection and the normal connection of the line to said common wire at the central office.

Each operator has a cord system, and it is conveniently mounted and arranged for her work. When a subscriber operates his generator to send in a call, his line is automatically connected to said common wire, with his armature-coil between the connection and the pairs of contact-points of the line, and the line-annunciator will be operated, indicating this call. The annunciator on operating will automatically disconnect the line from the common wire at the central office.

I will not explain in detail the operation of the operator's cord system in connection with the switchboards, as its operation will be apparent to those skilled in the art. It will be seen that when a line is switched with another line by the insertion of switch-plugs into their switches they are disconnected from the common wire $c$, in which is the rheotome.

When a line is tested, by placing a test-plug on a contact-piece $j$ of the line, and the line is not switched at any board and the line-annunciator does not indicate a call, there is a complete circuit, from the common wire, through the test receiving instrument, the pairs of switch contact-points of the line, over the line in the case of a metallic-circuit line, by way of the subscriber's station, back to the annunciator contact-points and the rheotome to the common wire; and a battery is in this circuit and the test receiving instrument will sound or respond to the vibrations of the rheotome, indicating to the operator that the line is free to be connected to. Should, however, the line be switched at any board, this circuit is open and the instrument will not sound or respond. Should, again, the line-annunciator indicate a call, this circuit is open at the pair of contact-points of the annunciator and the instrument will not sound or respond. When the instrument on a test being made does not respond, the operator knows, therefore, that either the line is switched for use or its annunciator indicates a call, and she will not then connect it with another line. The test receiving instruments and the battery should be such that when closed to the circuits with the rheotome the instrument will respond to the vibrations of the rheotome. The parts should, however, be so related to the line-annunciators that on a test of a line being made it will not operate the annunciators. For this purpose the annunciators may be such as will be operated only when one polarity of current passes through them, and the batteries may be so connected to the circuit as not to operate the annunciators.

I claim as my invention and desire to secure by Letters Patent—

1. A test-circuit for a metallic-circuit line, from one side or branch of the line, through the circuit of the line and then to a pair of switch contact-points normally in contact but open while the line is switched, to a common wire which extends to the subscriber's station and is normally open to the line there, and from said wire to a test wire or circuit containing a test receiving instrument and terminating in a test plug or device adapted to be brought for testing into connection with said side of the line, a rheotome in the circuit of said common wire, between said pair of switch contact-points and the point where said test-wire branches off from said common wire, an annunciator normally in the circuit of the line, a pair of contact-points operated by the annunciator to open the circuit of the line while the annunciator indicates a call, a switching device operated by the subscriber's generator which connects his line to said common wire while he sends a call, and a battery in the test-circuit established, substantially as set forth.

2. A test-circuit for a metallic-circuit line, from one side or branch of the line, through the circuit of the line and then to a pair of switch contact-points normally in contact but open while the line is switched, to a common wire which extends to the subscriber's station and is normally open to the line there, and from said wire to a test wire or circuit containing a test receiving instrument and terminating in a test plug or device adapted to be brought for testing into connection with said side of the line, a rheotome in the circuit of said common wire, between said pair of switch contact-points and the point where said test-wire branches off from said common wire a pair of contact-points operated by the line-annunciator to open the circuit of the line while the annunciator indicates a call and a battery in the circuit between said switch-points and said test-plug, substantially as set forth.

3. In a multiple-switchboard exchange, a test-circuit for a metallic-circuit line, from one side or branch of the line, through the circuit of the line and then to pairs of switch contact-points, one pair on each of several boards and each pair normally closed but open while the line is switched at their board, to a common wire which extends to the subscriber's station and is normally open there to the line and from said wire to a test wire or circuit containing a test receiving instrument and terminating in a test plug or device adapted to be brought for testing into connection with said side or branch of the line, a rheotome in the circuit of said common wire, between said pairs of switch contact-points and the point where said test-wire branches off from said common wire, an annunciator normally in the circuit of the line, a switching device operated by the subscriber's generator which connects his line to said common wire while he sends a call and a battery in the test-circuit established, substantially as set forth.

4. In a multiple-switchboard exchange, a test-circuit for a metallic-circuit line, from one side or branch of the line, through the circuit of the line and then to pairs of switch contact-points, one pair on each of several boards and each pair normally closed but open while the line is switched at their board, to a common wire which extends to the subscriber's station and is normally open to the line there, and from said wire to a test wire or circuit containing a test receiving instrument and terminating in a test plug or device adapted to be brought for testing into connection with said side or branch of the line, in combination with a calling-generator at the subscriber's station with switching devices to connect the line with said common wire while a call is being sent in, an annunciator normally in the circuit of the line, a rheotome in the circuit of said common wire, between said pair of switch contact-points and the point where said test-wire branches off from said common wire and a battery in the circuit between said switch-points and said test-plug, substantially as set forth.

5. In a multiple-switchboard exchange, a test-circuit for a metallic-circuit line, from one side or branch of the line, through the circuit of the line and then to a pair of switch contact-points normally in contact but open while the line is switched by the switch which controls them, to a common wire which extends to the subscriber's station and is normally open to the line there, and from said wire to several test wires or circuits, each branching off from said wire to its switchboard, containing in its circuit at the board a test receiving instrument and terminating in a test plug or device adapted to be brought for testing into connection with said side or branch of the line, in combination with a calling-generator at the subscriber's station, switching devices to connect the line with said common wire to operate the line-annunciator, a pair of contact-points operated by the line-annunciator to open the line-circuit while the annunciator indicates a call, a rheotome in the circuit of said common wire between said pair of switch contact-points and the place where said test-wires branch off from said wire and a battery in the circuit between said pair of contact-points and any test-plug substantially as set forth.

6. In a multiple-switchboard exchange, a test-circuit for a metallic-circuit line, from one side or branch of the line, through the circuit of the line and pairs of switch contact-points, one pair on each of several boards and each pair normally closed but open while the line is switched at their board, to a common wire which extends to the subscriber's station and is normally open to the line there, and from said wire to several test-wires, one for each board, each branching from said wire to its board and containing at the board a test receiving instrument and terminating in a test plug or device adapted to be brought for testing into connection with said side or branch of the line, in combination with a calling-generator at the subscriber's station, switching devices to connect the line with said common wire to operate the line-annunciator, a pair of contact-points operated by the line-annunciator to open the line-circuit while the annunciator indicates a call a rheotome in the circuit of said common wire between said pair of switch contact-points and the place where said test-wires branch off from said wire and a battery in any test-circuit established, substantially as set forth.

7. In a telephone-exchange system, a telephone-line normally passing, successively, through pairs of switch contact-points, one pair on each of several boards, each pair normally closed but open while the line is switched at their board, and thence connected with a common wire which passes to the subscriber's station and is normally open to the line there, in combination with an annunciator normally in the circuit of the lines, a pair of contact-points operated by the annunciator to open the circuit of the line while the annunciator indicates a call, a switching device operated by the subscriber's generator which connects his line to said common wire while he sends a call, a test wire or circuit branching off from said wire, containing a test receiving instrument and terminating in a test-plug adapted to be brought for testing into connection with the line before it passes to said pairs of contact-points a rheotome in the circuit of said common wire, between said pair of switch contact-points and the point where said test-wire branches off from said common wire and a battery in the test-circuit established, substantially as set forth.

8. In a telephone-exchange system, multiple switchboards, metallic-circuit lines, switches for said lines, one switch on each board for each line, each switch containing a pair of contact-points normally in contact but separated while the line is switched at their board and a third contact-piece insulated from the rest (except by the circuit connections), one branch of the line passing, successively, through the pairs of contact-points of its switches and thence to a common wire which extends to the subscribers' stations and is there open to the lines, and the other branch of the line being connected to said third contact-pieces of its switches, in combination with a pair of contact-points operated by the line-annunciator to open the circuit of the line while the annunciator indicates a call test-wires, one for each board, each branching off from said common wire, containing a test receiving instrument and terminating in a test plug or device adapted to be brought for testing into connection with any of said third contact-pieces at its board, a rheotome in the circuit of said common wire between said pair of switch contact-points and the place where said test-wires branch off from said wire and a battery in the circuit between said lines and any test-plug, substantially as set forth.

9. In a multiple-switchboard exchange, a test-circuit for a telephone-line, from a test-wire terminating in a test plug or device to a contact-piece connected with the line when a test is applied, thence through a pair of switch contact-points normally in contact but open while the line is switched by a switch which controls them, to a common wire which extends to the subscriber's station and is normally open to the line there and from which said test-wire branches, in combination with a calling-generator at the subscriber's station, switching devices to connect the line with said common wire to operate the line-annunciator, a pair of contact-points operated by the line-annunciator to open the line-circuit while the annunciator indicates a call, a test receiving instrument in said test-wire, a rheotome in the circuit of said common wire between said pair of switch contact-points and the point where said test-wire branches off from said common wire, and a battery in the test-circuit established on testing, substantially as set forth.

10. In a multiple-switchboard exchange, a test-circuit for a telephone-line, from a test-wire terminating in a test plug or device to the circuit of the line where the test is applied, thence through pairs of switch contact-points, one pair on each of several boards, each pair normally closed but open while the line is switched at their board, to a common wire which extends to the subscriber's station and is normally open to the line there and from which said test-wire branches, in combination with a calling-generator at the subscriber's station, switching devices to connect the line with said common wire to operate the line-annunciator, a pair of contact-points operated by the line-annunciator to open the line-circuit while the annunciator indicates a call, a test receiving instrument in said test-wire, a rheotome in the circuit of said common wire between said pairs of switch contact-points and the point where said test-wire branches off from said common wire, and battery in the circuit between said switch contact-points and said test-plug, substantially as set forth.

11. In a telephone-exchange system, multiple switchboards, telephone-lines, and switches for said lines, one switch for each line on each board, each switch having a pair of contact-points normally in contact but open while its line is switched at their board, each line normally passing successively through the pairs of contact-points of its switches, and the lines thence uniting into a common wire which extends to all the subscribers' stations and in which is a rheotome, in combination with an annunciator normally in the circuit of the lines, a pair of contact-points operated by the annunciator to open the circuit of the line while the annunciator indicates a call, a switching device operated by the subscriber's generator which connects his line to said common wire while he sends a call, test receiving instruments one at each board each connected on one side to said common wire with the rheotome between the connection and the pairs of switch contact-points of the lines and connected on its other side to a test plug or device adapted to be brought for testing into connection with any line whether the line is switched or not and a battery in any test-circuit established on testing, substantially as set forth.

In witness whereof I hereunto subscribe my name this 29th day of November, 1889.

MILO G. KELLOGG.

Witnesses:
EMIL ABENHEIM,
MARGARETHA RIEHL.